US007873011B2

(12) United States Patent  (10) Patent No.: US 7,873,011 B2
Wang et al.  (45) Date of Patent: Jan. 18, 2011

(54) APPARATUS, METHOD AND COMPUTER PROGRAM PRODUCT FOR BI-DIRECTIONAL RESOURCE ALLOCATION TO DECREASE SIGNALING FOR RETRANSMISSIONS

(75) Inventors: Hai Ming Wang, Beijing (CN); Da Jie Jiang, Beijing (CN)

(73) Assignee: Nokia Corporation, Espoo (FI)

( * ) Notice: Subject to any disclaimer, the term of this patent is extended or adjusted under 35 U.S.C. 154(b) by 398 days.

(21) Appl. No.: 11/891,148

(22) Filed: Aug. 8, 2007

(65) Prior Publication Data

US 2009/0040928 A1  Feb. 12, 2009

(51) Int. Cl.
  H04W 4/00  (2009.01)
  H04J 4/00  (2006.01)
(52) U.S. Cl. .................. 370/330; 370/436; 370/478
(58) Field of Classification Search .......... 370/203, 370/208, 280, 294, 310, 320, 321, 326, 330, 370/335, 336, 337, 342, 347, 441, 442, 458; 714/18, 748, 749, 750
See application file for complete search history.

(56) References Cited

U.S. PATENT DOCUMENTS

| 6,301,249 | B1 * | 10/2001 | Mansfield et al. ........... 370/394 |
| 2004/0190482 | A1 * | 9/2004 | Baum et al. ................. 370/347 |
| 2005/0107123 | A1 * | 5/2005 | Ishii et al. ................... 455/560 |
| 2005/0226198 | A1 | 10/2005 | Barak et al. ................. 370/345 |
| 2006/0062140 | A1 * | 3/2006 | Sudo .......................... 370/203 |
| 2007/0245201 | A1 * | 10/2007 | Sammour et al. ........... 714/748 |
| 2008/0059859 | A1 * | 3/2008 | Marinier et al. ............. 714/748 |

(Continued)

FOREIGN PATENT DOCUMENTS

EP  1 833 182 A1  9/2007

(Continued)

OTHER PUBLICATIONS

3GPP TR 25,814 V.7.0.0, section 9.1.2.5 (Jun. 2006), "Technical Report, 3rd Generation Partnershp Project; Technical Specification group Radio Access Network; Physical layer aspects for evolved Universal Terrestrial Radio Access (UTRA) (Release 7)", 3 pgs.

*Primary Examiner*—Seema S Rao
*Assistant Examiner*—Xavier Szewai Wong
(74) *Attorney, Agent, or Firm*—Harrington & Smith

(57) ABSTRACT

Methods and apparatus operative in a wireless communications system divide a communications resource available for performing information transmission and retransmission operations into a plurality of communication resource units. The units are ordered in a predetermined order. A first group of communication resource units are selected from the communication resource in ascending order and assigned to a first group of communications devices to perform information transmission operations in a first time period. A second group of communication resource units are selected from the communication resource in descending order and assigned to a second group of communications devices to perform information transmission operations in a second time period. At least a portion of the first group of communication resource units is assigned to the first group of communication resource units to perform retransmission operations. In operation often the first group of communication resource units will be available to perform retransmission operations in the second time period. In such a manner a non-adaptive HARQ retransmissions can be accommodated in a 3GPP LTE OFDM based wireless communications system.

32 Claims, 4 Drawing Sheets

U.S. PATENT DOCUMENTS

| | | | |
|---|---|---|---|
| 2008/0090583 A1* | 4/2008 | Wang et al. | 455/452.1 |
| 2008/0101319 A1* | 5/2008 | Rao | 370/342 |
| 2008/0137597 A1* | 6/2008 | Lu | 370/329 |
| 2010/0009677 A1* | 1/2010 | Karabinis et al. | 455/430 |

FOREIGN PATENT DOCUMENTS

| | | |
|---|---|---|
| WO | WO 2006/070484 A1 | 7/2006 |
| WO | WO 2007/007522 A2 | 7/2007 |

* cited by examiner

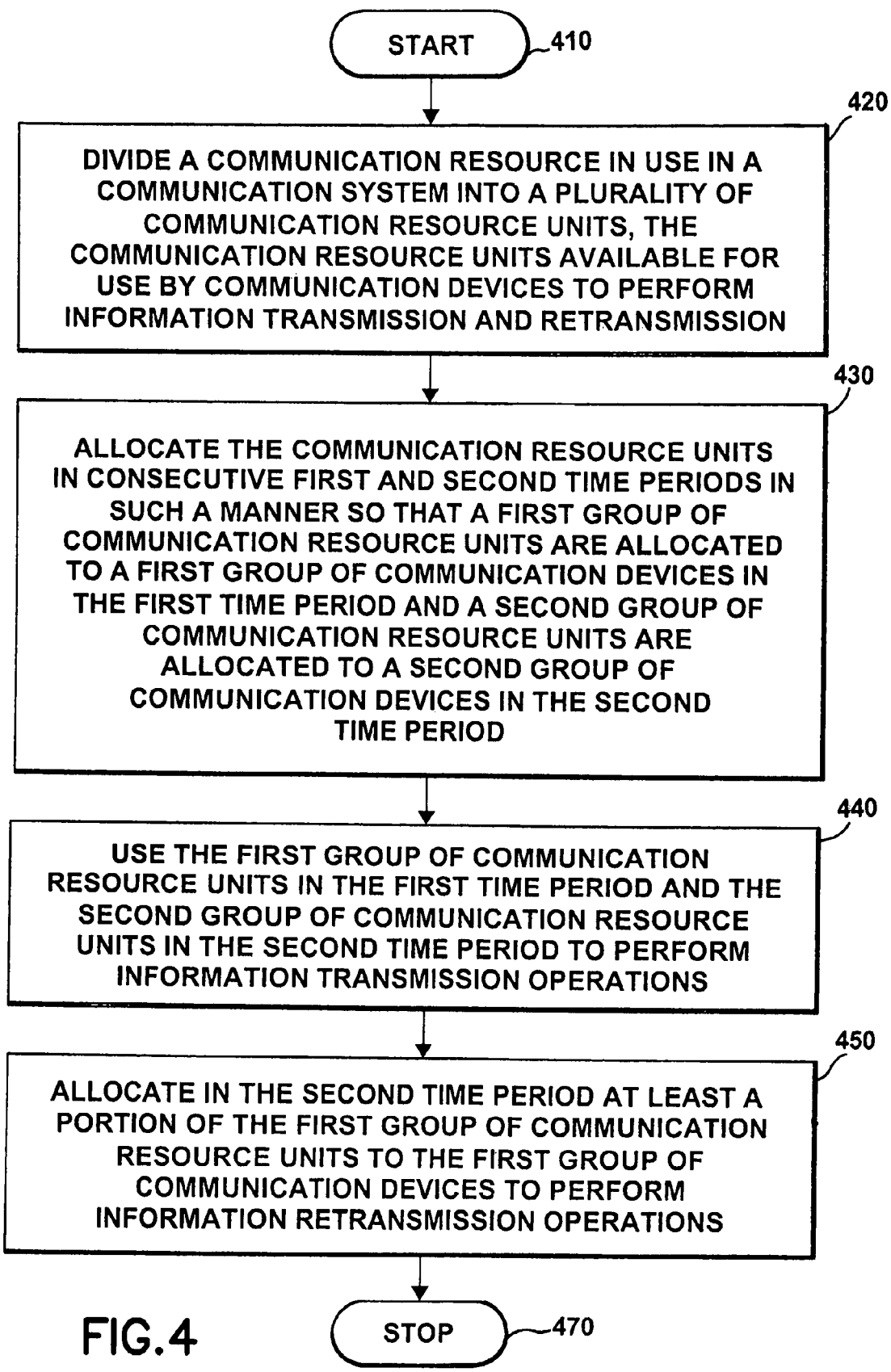

APPARATUS, METHOD AND COMPUTER PROGRAM PRODUCT FOR BI-DIRECTIONAL RESOURCE ALLOCATION TO DECREASE SIGNALING FOR RETRANSMISSIONS

TECHNICAL FIELD

The exemplary and non-limiting embodiments of this invention relate generally to wireless communication systems, methods, devices and computer program products and, more specifically, relate to techniques for use during the scheduling of transmissions to and from multiple receivers.

BACKGROUND

The following abbreviations are herewith defined:
3GPP third generation partnership project
ARQ automatic repeat request
BLER block error ratio
C/I carrier to interference ratio
CQI channel quality indicator
DL downlink
HARQ hybrid ARQ
LTE long term evolution
Node B base station
eNB evolved Node B
OFDMA orthogonal frequency division multiplexing access
OFDM orthogonal frequency division multiplexing
SC-FDMA single carrier-frequency division multiplexing access
PRB physical resource block
PS Packet Scheduler
TTI transmission timing interval
UL uplink
UE user equipment
UTRAN universal terrestrial radio access network
EUTRAN evolved UTRAN
aGW access gateway A proposed communication system known as evolved UTRAN (E-UTRAN, also referred to as UTRAN-LTE) is at present a study item within the 3GPP. The current working assumption is that the access technique will be OFDMA for the DL and SC-FDMA for the UL, which are both based on OFDM technique and can be expected to provide an opportunity to perform link adaptation and user multiplexing in the frequency domain.

Several publications have reported the results of studies related to frequency domain packet scheduling for OFDM based systems such as UTRAN-LTE. However, these publications do not explicitly discuss how to accommodate the simultaneous scheduling of new data and pending HARQ retransmissions.

As is described in section 9.1.2.5 of 3GPP TR 25.814 V7.0.0 (2006-06), Technical Report, 3rd Generation Partnership Project; Technical Specification Group Radio Access Network; Physical layer aspects for evolved Universal Terrestrial Radio Access (UTRA) (Release 7), in general HARQ can be classified as being synchronous or asynchronous.

Synchronous HARQ implies that (re)transmissions for a certain HARQ process are restricted to occur at known time instants. No explicit signaling of the HARQ process number is required as the process number can be derived from, e.g., the subframe number.

Asynchronous HARQ implies that (re)transmission for a certain HARQ process may occur at any time. Explicit signaling of the HARQ process number is therefore required.

In principle, synchronous operation with an arbitrary number of simultaneous active processes at a time instant could be envisioned. In this case, additional signaling may be required. Asynchronous operation already supports an arbitrary number of simultaneous active processes at a time instant. Furthermore, note that, in a synchronous scheme the transmitter may choose not to utilize all possible retransmission instants, e.g., to support pre-emption. This may require additional signaling.

The various forms of HARQ are further classified as adaptive or non-adaptive in terms of transmission attributes, e.g., the resource unit (RU) allocation, modulation and transport block size, and the duration of the retransmission. Control channel requirements can be different for each case.

Adaptive HARQ implies that the transmitter may change some or all of the transmission attributes used in each retransmission, as compared to the initial transmissions (e.g. due to changes in the radio conditions). Hence, the associated control information needs to be transmitted with the retransmission. The changes considered are: modulation, resource unit allocation and duration of transmission.

Non-adaptive HARQ implies that changes, if any, in the transmission attributes for the retransmissions are known to both the transmitter and receiver at the time of the initial transmission. Hence, associated control information need not be transmitted for the retransmission.

With those definitions, the HS-DSCH in WCDMA uses an adaptive, asynchronous HARQ scheme, while the E-DCH in WCDMA uses a synchronous, non-adaptive HARQ scheme.

The capability to adaptively change the packet format (i.e., adaptive IR) and the transmission timing (i.e., asynchronous IR) yields an adaptive, asynchronous IR based HARQ operation. Such a scheme has the potential of optimally allocating the retransmission resources in a time varying channel. For each HARQ retransmission, control information about the packet format needs to be transmitted together with the data sub-packet. This increases overhead associated with retransmission operations Synchronous HARQ transmission entails operating the system on the basis of a predefined sequence of retransmission packet format and timing.

Non-adaptive HARQ is a good solution to decrease scheduling signaling for re-transmissions. However, for semi-persistent scheduling where initial transmissions are persistently allocated, it is hard to enable non-adaptive HARQ as much as possible. Adaptive HARQ in addition to non-adaptive HARQ is essential for semi-persistent scheduling because some resources for retransmissions are already occupied by initial transmissions of other users through persistent allocation.

The preliminary results show the proportion of non-adaptive HARQ is only about 30-40% at capacity point of semi-persistent scheduling (when using non-adaptive HARQ as much as possible). The remaining 60-70% of retransmissions are using adaptive HARQ (a 'Grant' along with NAK is sent), and then large signaling for retransmission is needed, which is the main parts of control signaling for semi-persistent scheduling.

Accordingly, those skilled in the art seek methods, apparatus and computer program products that would enable the increased use of non-adaptive HARQ to decrease control signaling.

SUMMARY OF THE INVENTION

A first embodiment of the invention is a method comprising: dividing a communication resource in use in a communication system into a plurality of communication resource units, the communication resource units available for use by communication devices to perform information transmission and retransmission; ordering the communication resource units in accordance with a predetermined ordering criterion; allocating the communication resource units in consecutive first and second time periods in such a manner so that a first group of communication resource units are selected from the communication resource starting from a first end of the communication resource and assigned to a first group of communication devices for use in the first time period and a second group of communication resource units are selected starting from a second end of the communication resource and assigned to a second group of communication devices for use in the second time period; using the first group of communication resource units in the first time period and the second group of communication resource units in the second time period to perform information transmission operations; and allocating in the second time period at least a portion of the first group of communication resource units to the first group of communication devices to perform information retransmission operations.

A second embodiment of the invention is a method comprising: dividing a communication resource in use in a communications system into a plurality of communication resource units, the communication resource units available for use by communication devices to perform information transmission and retransmission; allocating the communication resource units in consecutive first and second time periods in such a manner so that a first group of communication resource units are allocated to a first group of communication devices in the first time period and a second group of communication resource units are allocated to a second group of communication devices in the second time period; using the first group of communication resources units in the first time period and the second group of communication resource units in the second time period to perform information transmission operations; and allocating in the second time period at least a portion of the first group of communication resource units to the first group of communication devices to perform information retransmission operations.

A third embodiment of the invention is an electronic device comprising: a transceiver configured for bidirectional communication in a wireless communications system; a memory for storing at least one computer program, the computer program configured to operate the electronic device when executed; and processing apparatus configured to execute the at least one computer program, wherein when the at least one computer program is executed the electronic device is configured to divide a communication resource in use in a communications system into a plurality of communication resource units; to allocate the communication resource in consecutive first and second time periods in such a manner so that a first group of communication resource units are allocated to a first group of communication devices in the first time period and a second group of communication resource units are allocated to a second group of communication devices in the second period, the first and second groups of communication resource units allocated to the first and second groups of communication devices in the first and second time periods, respectively, to perform information transmission operations; and to allocate in the second time period at least a portion of the first group of communication resource units to the first group of communication devices to perform information retransmission operations.

A fourth embodiment of the invention is a computer program product comprising: a computer readable memory medium tangibly embodying a computer program, the computer program configured to be executed by processing apparatus of an electronic device operating in a communications system, wherein when executed the computer program is configured to cause the electronic device to divide a communication resource in use in a communication system into a plurality of communication resource units, the communication resource units available for use by communication devices to perform information transmission and retransmission; to allocate the communication resource units in consecutive first and second time periods in such a manner so that a first group of communication resource units are allocated to a first group of communication devices in the first time period and a second group of communication resource units are allocated to a second group of communication devices in the second time period, the first and second groups of communication resource units allocated to the first and second communication devices in the first and second time periods, respectively, to perform information transmission operations; and to allocate in the second time period at least a portion of the first group of communication resource units to the first group of communication devices to perform information transmission operations.

A fifth embodiment of the invention is an electronic device comprising: transceiver means for performing bidirectional communication operations in a wireless communications system; memory means for storing at least one computer program, the computer program configured to operate the electronic device when executed; and processing means for executing the at least one computer program, wherein when the at least one computer program is executed the electronic device is configured to divide a communication resource in use in a communications system into a plurality of communication resource units; to allocate the communication resource in consecutive first and second time periods in such a manner so that a first group of communication resource units are allocated to a first group of communication devices in the first time period and a second group of communication resource units are allocated to a second group of communication devices in the second period, the first and second groups of communication resource units allocated to the first and second groups of communication devices in the first and second time periods, respectively, to perform information transmission operations; and to allocate in the second time period at least a portion of the first group of communication resource units to the first group of communication devices to perform information retransmission operations.

In conclusion, the foregoing summary of the embodiments of the present invention is exemplary and non-limiting. For example, one of ordinary skill in the art will understand that one or more aspects or steps from one embodiment can be combined with one or more aspects or steps from another alternate embodiment to create a new embodiment within the scope of the present invention.

BRIEF DESCRIPTION OF THE DRAWINGS

In the attached Drawing Figures:

FIG. 4 is another flow chart depicting a method operating in accordance with the invention.

DETAILED DESCRIPTION

In accordance with the exemplary embodiments of the invention there are provided methods, apparatus and computer program products to extend and enhance a frequency domain packet scheduler to accommodate scheduling of HARQ retransmissions in such a manner so that non-adaptive HARQ retransmission procedures can be used more frequently. In methods, apparatus and computer program products of the invention when non-adaptive HARQ procedures are not available, adaptive HARQ procedures are used.

Further in accordance with the exemplary embodiments of this invention there is provided a technique for allocating communications in OFDM systems, including the scheduling of both new data and pending HARQ retransmissions. In order to describe the exemplary embodiments the 3GPP LTE system is used as a non-limiting example of one OFDM system. In one such embodiment the uplink bandwidth is divided into a set of physical resource blocks (PRBs), each containing of 25 neighboring sub-carriers. Thus, in a 10 MHz bandwidth, there exist 24 PRBs. User multiplexing in the frequency domain is assumed to be controlled by a resource allocator, with a granularity of a maximum one user per PRB. Users are allowed to be multiplexed on several PRBs. In the 3GPP LTE system the resource allocator is resident at the eNB, although this is not a limitation upon the practice of the exemplary embodiments of this invention.

Figure 1:
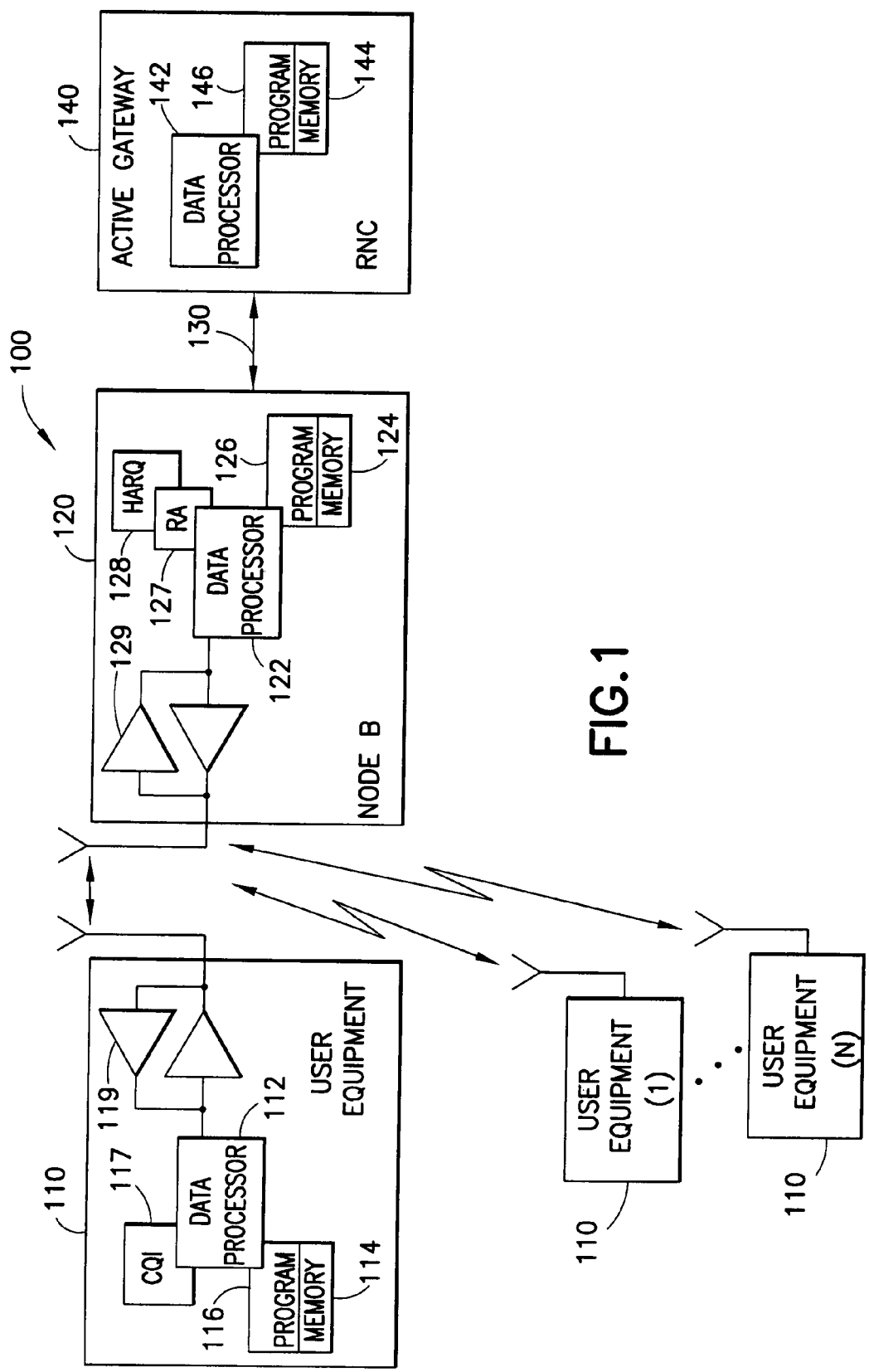
FIG. 1 shows a simplified block diagram of various electronic devices that are suitable for use in practicing the exemplary embodiments of this invention.

Reference is made to FIG. 1 for illustrating a simplified block diagram of various electronic devices that are suitable for use in practicing the exemplary embodiments of this invention. In FIG. 1 a wireless network 100 is adapted for communication with at least one UE 110 via a Node B (base station), which for LTE is referred to as the eNB 120. The network 100 may include a network element (NE) 140, such as an aGW. The UE 110 includes a data processor (DP) 112, a memory (MEM) 114 that stores a program (PROG) 116, and a suitable radio frequency (RF) transceiver 119 for bidirectional wireless communications with the eNB 120, which also includes a DP 122, a MEM 124 that stores a PROG 126, and a suitable RF transceiver 129. The eNB 120 is coupled via a data path 130 to the NE 140 that also includes a DP 142 and a MEM 144 storing an associated PROG 146.

Note that in FIG. 1 there may typically be a plurality of UEs 100 present in the cell serviced by the eNB 120, labeled for convenience as User_1, User_2, . . . , User_N.

Also shown in FIG. 1 there is a frequency domain Resource Allocator 127 and a HARQ function 128 located at the eNB 120. These two units cooperate with one another during the operation of the eNB 120, as will be discussed below. The UE 110 may include a CQI unit 117 for reporting CQI information to the eNB 120.

For the embodiment shown in FIG. 1 at least the PROG 126 is assumed to include program instructions that, when executed by the associated DP, enable the electronic device to operate in accordance with the exemplary embodiments of this invention, as will be discussed below in greater detail.

In general, the various embodiments of the UE 110 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the DP 122, or by hardware, or by a combination of software and hardware.

The MEMs 114, 124 and 144 may be of any type suitable to the local technical environment and may be implemented using any suitable data storage technology, such as semiconductor-based memory devices, magnetic memory devices and systems, optical memory devices and systems, fixed memory and removable memory. The DPs 112, 122 and 142 may be of any type suitable to the local technical environment, and may include one or more of general purpose computers, special purpose computers, microprocessors, digital signal processors (DSPs) and processors based on a multi-core processor architecture, as non-limiting examples.

Since LTE UL is synchronous-HARQ-based which means there is a fixed number of TTIs between initial transmission and retransmission and initial transmissions are prior to retransmissions in semi-persistent scheduling, to enable non-adaptive HARQ as much as possible and to reduce signaling for retransmissions, in embodiments of the invention resources are reserved for retransmissions when possible.

In an exemplary embodiment of the invention, bidirectional resource allocation is used for initial transmissions: the RB (Resource Block) allocation for initial transmission is done from two opposite directions of the whole bandwidth between one HARQ RTT. Non-adaptive HARQ is used as much as possible; if non-adaptive HARQ cannot be used, then adaptive HARQ is used.

In a practical system, initial transmissions can not occupy the entire bandwidth. So it is possible to do bidirectional resource allocation for initial transmissions and this can enlarge proportion of non-adaptive HARQ.

The method cannot enable non-adaptive HARQ for the second retransmission, but first transmissions are more numerous than second transmissions, so the impact is marginal.

Figure 2:
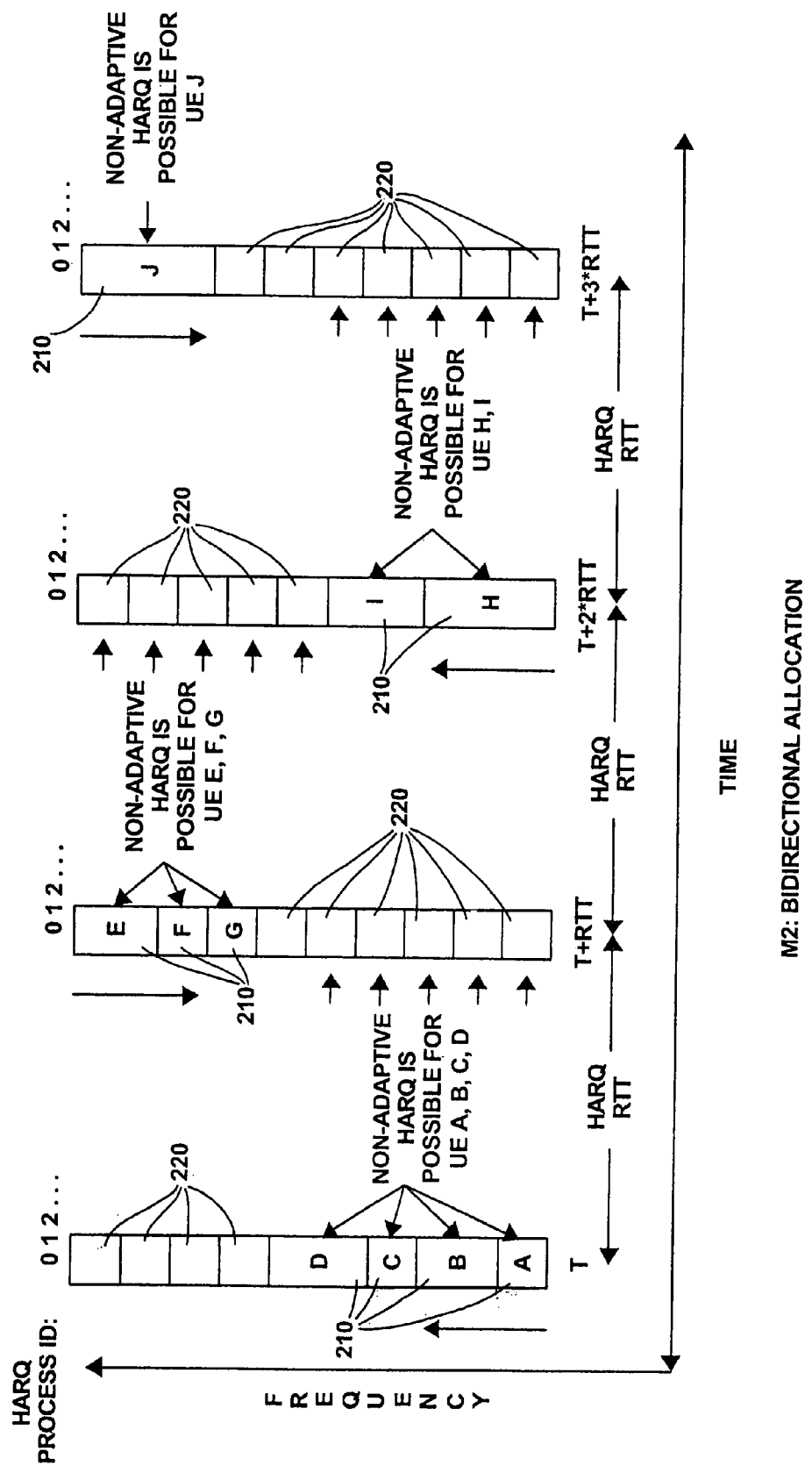
FIG. 2 illustrates a frequency domain scheduling method in accordance with the exemplary embodiments of this invention.

FIG. 2 depicts an implementation: Users A to J 210 and their resource block allocation are shown in FIG. 2 (all are new transmissions). The blocks 210 bearing letters identify resources for the initial allocation (pre-occupied). The empty blocks 220 correspond to free resources that can be used for retransmissions. At time "T", users A to D 210 are active and resources are allocated for their initial transmission. At time "T+RTT", users E to G become active and the resources are allocated to them first (initial transmissions have the highest priority). However, the resource allocation is done from the opposite direction compared to the prior time "T". After that, it will be determined whether retransmission is necessary for users A to D. If so, non-adaptive HARQ may be used because there are free resources left corresponding to those used by users A to D at time T after initial resource allocation to users E to G at time "T+RTT".

Figure 3:
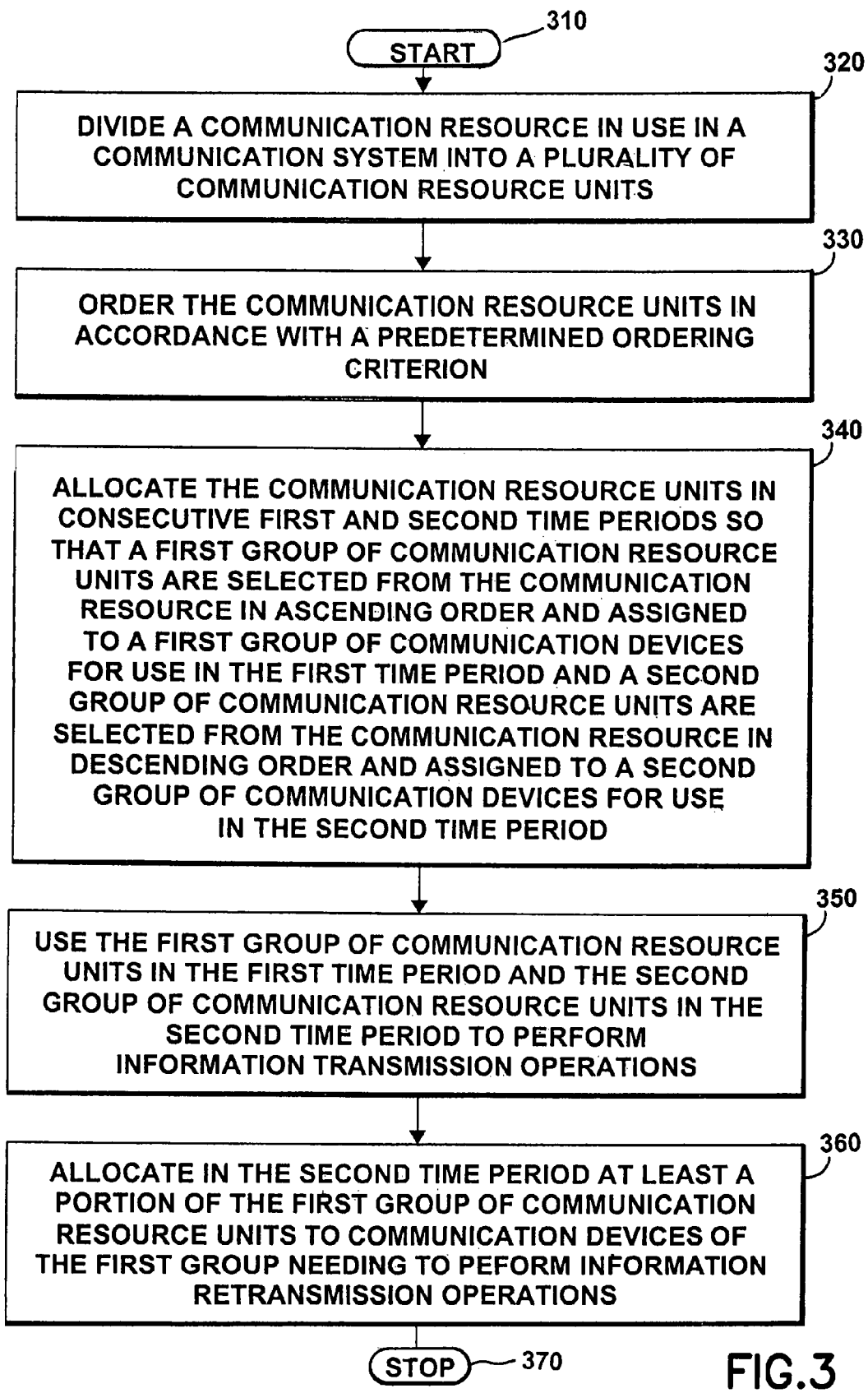
FIG. 3 is a flow chart depicting a method operating in accordance with the invention.

Methods operating in accordance with the invention are summarized in FIGS. 3-4. The method depicted in FIG. 3 starts at 310. Next, at 320, a communication resource in use in a communication system is divided into a plurality of communication resource units. Then, at 330, the communication resource units are ordered in accordance with a predetermined ordering criterion. Next, at 340, the communication resource units are allocated in consecutive first and second time periods so that a first group of communication resource units are selected from the communication resource in ascending order and assigned to a first group of communication devices for use in a first time period and a second group of communication resource units are selected from the communication resource in descending order and assigned to a second group of communication devices for use in the second time period. Then, at 350, the first group of communication resource units and the second group of communication resource units are used, respectively, in the first and second time periods to perform information transmission operations. Next, at 360, at least a portion of the first group of communication resource units is allocated in the second time period to the first group to perform information retransmission operations.

FIG. 4 is a block diagram depicting another method operating in accordance with the invention. The method starts at 410. Then, at 420, a communication resource in use in a communication system is divided into a plurality of communication resource units, the communication resource units available for use by communication devices to perform information transmission and retransmission. Next, at 430, the communication resource units are allocated in consecutive first and second time periods in such a manner so that a first group of communication resource units are allocated to a first group of communication devices in the first time period and a second group of communication resource units are allocated to a second group of communication devices in the second time period. Then, at 440, the first group of communication resource units and the second group of communication resource units are used, respectively, in first and second time periods to perform information transmission operations. Then, at 450, at least a portion of the first group of communication resource units is allocated in the second time period to the first group of communication devices to perform information retransmission operations.

In a variant of the method depicted in FIG. 4, the communication system is an OFDM based wireless communications system. In another variant of the method depicted in FIG. 4 the communication resource units comprise physical resource blocks available to perform information transmission and retransmission operations in the OFDM based wireless communications system. In a further variant of the method depicted in FIG. 4, the OFDM based wireless communications system is a 3GPP LTE wireless communications system.

In yet another variant of the method depicted in FIG. 4, the information retransmission operations to be performed using at least a portion of the first group of communication resource units are HARQ non-adaptive retransmission operations.

In a still further variant of the method depicted in FIG. 4, dividing a communication resource in use in a communication system into a plurality of communication resource units further comprises arraying the communication resource units in consecutive order in accordance with a predetermined ordering criterion (e.g., frequency); and allocating the communication resource units in consecutive first and second time periods further comprises selecting the first group of communication resource units starting from a first end of the communication resource for allocation to the first group of communication devices for use in the first time period and selecting the second group of communication resource units starting from a second end of the communication resource for allocation to the second group of communication devices for use in the second time period. In various embodiments, the first group may be selected in ascending order and the second group may be selected in descending order, or vice versa. Although in an exemplary and non-limiting example the communication resource units are ordered consecutively by frequency, one skilled in the art will understand that many different ordering methods may be adopted, including those that purposely scramble the frequency order.

In another variant of the method depicted in FIG. 4, allocating in the second time period at least a portion of the first group of communication resource units to the first group of communication devices to perform information retransmission operations further comprises: determining which of the communication resource units from the first group are available to perform information retransmission operations in the second time period; and allocating those communication resource units determined to be available to the first group of communication devices to perform information retransmission operations in the second time period.

In a further variant of the method depicted in FIG. 4, allocating those communication resource units determined to be available to the first group of communication devices to perform information retransmission operations in the second time period further comprises: determining which communication resource units were assigned to particular communication devices comprising the first group of communication devices during the first time period to perform information transmission operations; and assigning those communication resource units from the first group of communication resource units determined to be available to perform information retransmission operations in the second time period to the same communication devices as in the second time period.

In yet another variant of the method depicted in FIG. 4, the method further comprises: after assigning those communication resource units from the first group of communication resources units determined to be available to perform information retransmission operations in the second time period to the same communication devices as in the first time period, determining whether any communication devices from the first group have not been assigned communication resource units to perform information retransmission operations in the second time period.

In a still further variant of the method depicted in FIG. 4, the method further comprises: when it is determined that least one communication device from the first group of communication devices has not been assigned a communication resource unit to perform information retransmission operations in the second time period, assigning the at least one communication device at least one communication resource unit to perform information retransmission operations in the second time period, the at least communication resource unit different from communication resource unit(s) used by the at least one communication device during the first time period to perform information transmission operations.

In another variant of the method depicted in FIG. 4 the information retransmission operations performed by the at least one communication device using the at least one communication resource unit different from communication resource unit(s) used by the at least one communication device during the first time period to perform information transmission operations are HARQ adaptive retransmission operations.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it should be understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. For example, the described number of PRBs, as well as the various types of scheduling algorithms, are exemplary, and should not be read as limitations upon the practice of the exemplary embodiments of this invention. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   dividing a communication resource in use in a communication system into a plurality of communication resource units, the communication resource units made available by an apparatus for use by communication devices to perform information transmission and retransmission;
   the apparatus ordering the communication resource units in accordance with a predetermined ordering criterion;
   the apparatus allocating the communication resource units in consecutive first and second time periods in such a manner so that a first group of communication resource units are selected from the communication resource starting from a first end of the communication resource and assigned to a first group of communication devices for use in the first time period and a second group of communication resource units are selected from the communication resource starting from a second end of the communication resource and assigned to a second group of communication devices for use in the second time period;
   the apparatus using the first group of communication resource units in the first time period and the second group of communication resource units in the second time period to perform information transmission operations; and
   the apparatus allocating in the second time period at least a portion of the first group of communication resource units to the first group of communication devices to perform information retransmission operations.

2. The method of claim 1 wherein the communication system is an orthogonal frequency division multiplexing based wireless communications system.

3. The method of claim 2 wherein the communication resource units comprise physical resource blocks available to perform information transmission and retransmission operations in the orthogonal frequency division multiplexing based wireless communication system.

4. The method of claim 3 wherein the orthogonal frequency division multiplexing based wireless communications system is a third generation partnership project long term evolution wireless communications system.

5. The method of claim 1 wherein the information retransmission operations to be performed using at least a portion of the first group of communication resource units are hybrid automatic repeat request non-adaptive retransmission operations.

6. The method of claim 1 wherein the apparatus allocating in the second time period at least a portion of the first group of communication resource units to the first group of communication devices to perform information retransmission operations further comprises:
   the apparatus determining which of the communication resource units from the first group are available to perform information retransmission operations in the second time period; and
   the apparatus allocating those communication resource units determined to be available to the first group of communication devices to perform information retransmission operations in the second time period.

7. The method of claim 6 wherein the apparatus allocating those communication resource units determined to be available to the first group of communication device to perform information retransmission operations in the second time period further comprises:
   the apparatus determining which communication resource units were assigned to particular communication devices comprising the first group of communications devices during the first time period to perform information transmission operations; and
   the apparatus assigning those communication resource units from the first group of communication resource units determined to be available to perform information retransmission operations in the second time period to the same communication devices as in the first time period.

8. The method of claim 7 further comprising:
   after the apparatus assigning those communication resource units from the first group of communication resource units determined to be available to perform information retransmission operations in the second time period to the same communication devices as in the first time period, the apparatus determining whether any communication devices from the first group have not been assigned communication resource units to perform information retransmission operations in the second time period.

9. The method of claim 8 further comprising:
   when it is determined by the apparatus that at least one communication device from the first group of communication devices has not been assigned a communication resource unit to perform information retransmission operations in the second time period, the apparatus assigning the at least one communication device at least one communication resource unit to perform information retransmission operations in the second time period, the at least communication resource unit different from communication resource unit(s) used by the at least one communication device during the first time period to perform information transmission operations.

10. The method of claim 9 wherein the information retransmission operations performed by the at least one communication device using the at least one communication resource unit different from communication resource unit(s) used by the at least one communication device during the first time period to perform information transmission operations are hybrid automatic repeat request adaptive retransmission operations.

11. An apparatus comprising:
a transceiver configured for bidirectional communication in a wireless communications system;
a memory storing at least one computer program, the computer program configured to operate the apparatus when executed; and
processing apparatus configured to execute the at least one computer program, wherein when the at least one computer program is executed the apparatus is configured to divide a communication resource in use in a communications system into a plurality of communication resource units; to allocate the communication resource in consecutive first and second time periods in such a manner so that a first group of communication resource units selected from the communication resource starting from a first end of the communication resource are allocated to a first group of communication devices in the first time period and a second group of communication resource units selected from the communication resource starting from a second end of the communication resource are allocated to a second group of communication devices in the second period, the first and second groups of communication resource units allocated to the first and second groups of communication devices in the first and second time periods, respectively, to perform information transmission operations; and to allocate in the second time period at least a portion of the first group of communication resource units to the first group of communication devices to perform information retransmission operations.

12. The apparatus of claim 11 wherein the apparatus is a base station operative in the wireless communications system.

13. The apparatus of claim 12 wherein the wireless communications system is an orthogonal frequency division multiplexing based wireless communication system.

14. The apparatus of claim 13 wherein the wireless communications system is a third generation partnership project long term evolution wireless communications system.

15. The apparatus of claim 11 wherein when the at least one computer program is executed the apparatus is further configured to array the communication resource units in consecutive order in accordance with a predetermined ordering criterion;
and wherein to allocate the communication resource in consecutive first and second time periods further comprises to select the first group of communication resource units starting from a first end of the communication resource for allocation to the first group of communication devices for use in the first time period and to select the second group of communication resource starting from a second end of the communication resource for allocation to the second group of communication devices for use in the second time period.

16. The apparatus of claim 11 wherein the information retransmission operations to be performed using at least a portion of the first group of communication resource units are hybrid automatic repeat request non-adaptive retransmission operations.

17. The apparatus of claim 11 wherein to allocate in the second time period at least a portion of the first group of communication resource units to the first group of communication devices to perform information retransmission operations further comprises: to determine which of the communication resource units from the first group are available to perform information retransmission operations in the second time period; and to allocate those communication resource units determined to be available to the first group of communication devices to perform information retransmission operations in the second time period.

18. The apparatus of claim 17 wherein to allocate those communication resource units determined to be available to the first group of communication devices to perform information retransmission operations in the second time period further comprises: to determine which communication resource units were assigned to particular communication devices comprising the first group of communication devices during the first time period to perform information transmission operations; and to assign those communication resource units from the first group of communication resource units determined to be available to perform information retransmission operations in the second time period to the same communication devices as in the first time period.

19. The apparatus of claim 18 wherein when the computer program is executed the vise apparatus is further configured, after assigning those communication resource units from the first group of communication resource units determined to be available to perform information retransmission operations in the second time period to the same communication devices as in the first time period, to determine whether any communication devices from the first group have not been assigned communication resource units to perform information retransmission operations in the second time period.

20. The apparatus of claim 19 wherein after the apparatus has determined that at least one communication device from the first group of communication devices has not been assigned a communication resource unit to perform information retransmission operations in the second time period, the apparatus is further configured to assign the at least one communication device at least one communication resource unit to perform information transmission operations in the second time period, the at least one communication resource unit different from communication resource unit(s) used by the at least one communication device during the first time period to perform information transmission operations.

21. The apparatus of claim 20 wherein the information retransmission operations performed by the at least one communication device using the at least one communication resource unit different from communication resource unit(s) used by the at least one communication device during the first time period to perform information transmission operations are hybrid automatic repeat request adaptive retransmission operations.

22. A non-transitory computer readable memory medium tangibly embodying a computer program, the computer program configured to be executed by processing apparatus of an electronic device operating in a communications system, wherein when executed the computer program is configured to cause the electronic device to divide a communication resource in use in a communication system into a plurality of communication resource units, the communication resource units available for use by communication devices to perform information transmission and retransmission; to allocate the communication resource units in consecutive first and second time periods in such a manner so that a first group of communication resource units selected from the communication resource starting from a first end of the communication resource are allocated to a first group of communication devices in the first time period and a second group of communication resource units selected from the communication resource starting from a second end of the communication resource are allocated to a second group of communication devices in the second time period, the first and second groups of communication resource units allocated to the first and second communication devices in the first and second time periods, respectively, to perform information transmission operations;

and to allocate in the second time period at least a portion of the first group of communication resource units to the first group of communication devices to perform information transmission operations.

23. The non-transitory computer readable memory medium of claim 22 wherein the communication system is an orthogonal frequency division multiplexing based wireless communications system.

24. The non-transitory computer readable memory medium of claim 23 wherein the communication resource units comprise physical resource blocks available to perform information transmission and retransmission operations in the orthogonal frequency division multiplexing based wireless communications system.

25. The non-transitory computer readable memory medium of claim 24 wherein the orthogonal frequency division multiplexing based wireless communication system is a third generation partnership project long term evolution wireless communications system.

26. The non-transitory computer readable memory medium of claim 24 wherein the information retransmission operations performed using at least a portion of the first group of communication resource units are hybrid automatic repeat request non-adaptive retransmission operations.

27. The non-transitory computer readable memory medium of claim 22 wherein to allocate in the second time period at least a portion of the first group of communication resource units to the first group of communication devices to perform information retransmission operations further comprises:
to determine which of the communication resource units from the first group are available to perform information retransmission operations in the second time period; and
to allocate those communication resource units determined to be available to the first group of communication devices to perform information retransmission operations in the second time period.

28. The non-transitory computer readable memory medium of claim 27 wherein to allocate those communication resource units determined to be available to the first group of communication device to perform information retransmission operations in the second time period further comprises:
to determine which communication resource units were assigned to particular communication devices comprising the first group of communications devices during the first time period to perform information transmission operations; and
to assign those communication resource units from the first group of communication resource units determined to be available to perform information retransmission operations in the second time period to the same communication devices as in the first time period.

29. The non-transitory computer readable memory medium of claim 28 wherein after assigning those communication resource units from the first the first group of communication resource units determined to be available to perform information retransmission operations in the second time period to the same communication devices as in the first time period, the non-transitory computer readable memory medium further configured to cause the electronic device to determine whether any communication devices from the first group have not been assigned communication resource units to perform information retransmission operations in the second time period.

30. The non-transitory computer readable memory medium of claim 29 wherein when it is determined that at least one communication device from the first group of communication devices has not been assigned a communication resource unit to perform information retransmission operations in the second time period, the non-transitory computer readable memory medium further configured to assign the at least one communication device at least one communication resource unit to perform information retransmission operations in the second time period, the at least communication resource unit different from communication resource unit(s) used by the at least one communication device during the first time period to perform information transmission operations.

31. The non-transitory computer readable memory medium of claim 30 wherein the information retransmission operations performed by the at least one communication device using the at least one communication resource unit different from communication resource unit(s) used by the at least one communication device during the first time period to perform information transmission operations are hybrid automatic repeat request adaptive retransmission operations.

32. An apparatus comprising:
transceiver means for performing bidirectional communication operations in a wireless communications system;
memory means for storing at least one computer program, the computer program configured to operate the apparatus when executed; and
processing means for executing the at least one computer program, wherein when the at least one computer program is executed the apparatus is configured to divide a communication resource in use in a communications system into a plurality of communication resource units; to allocate the communication resource in consecutive first and second time periods in such a manner so that a first group of communication resource units selected from the communication resource starting from a first end of the communication resource are allocated to a first group of communication devices in the first time period and a second group of communication resource units selected from the communication resource starting from a second end of the communication resource are allocated to a second group of communication devices in the second period, the first and second groups of communication resource units allocated to the first and second groups of communication devices in the first and second time periods, respectively, to perform information transmission operations; and to allocate in the second time period at least a portion of the first group of communication resource units to the first group of communication devices to perform information retransmission operations.

* * * * *

UNITED STATES PATENT AND TRADEMARK OFFICE
CERTIFICATE OF CORRECTION

| | | |
|---|---|---|
| PATENT NO. | : 7,873,011 B2 | Page 1 of 1 |
| APPLICATION NO. | : 11/891148 | |
| DATED | : January 18, 2011 | |
| INVENTOR(S) | : Wang et al. | |

It is certified that error appears in the above-identified patent and that said Letters Patent is hereby corrected as shown below:

Claim 19, col. 12, line 31 delete "vise".

Signed and Sealed this
Fifth Day of April, 2011

David J. Kappos
*Director of the United States Patent and Trademark Office*